Patented Jan. 5, 1943

2,307,057

UNITED STATES PATENT OFFICE 2,307,057

TRANSPARENT FILM

James A. Mitchell, Kenmore, N. Y., assignor to E. I. du Pont de Nemours & Company, Wilmington, Del, a corporation of Delaware No Drawing. Application August 7, 1940,
Serial No. 351,781

19 Claims. (Cl. 117—146)

This invention relates to moistureproof sheet wrapping material, especially transparent, non-fibrous, moistureproofed cellulosic web. More particularly, it appertains to the transparentizing of moistureproofing coatings on films of regenerated cellulose, and the like.

Recently there has appeared in commerce a transparent, moistureproof, sheet wrapping material comprising a base sheet of regenerated cellulose having a thin moistureproofing coating. The moistureproofing coating ordinarily employed comprises essentially film-forming (binding, cementing) material, for example, nitrocellulose, and moistureproofing material, for example, a waxy substance such as paraffin wax. The coating may also contain transparentizing (homogenizing, blending) material and/or plasticizing material.

The manufacture of such a base sheet is described in U. S. A. Patent No. 1,548,864 (Brandenberger), and the coating thereof with typical moistureproofing coating compositions is described in U. S. A. Patents Nos. 1,737,187 and 1,826,696 (Charch & Prindle), 1,826,697-8 (Charch & Craigue), and 2,147,180 (Ubben).

Moistureproofing of non-moistureproof sheet material appears to be due to material which is inherently moistureproof (the moistureproofing material of the moistureproofing coating), and the laying down of this material (either alone or in combination with binding material) in a continuous, unbroken film or layer. Very often when the moistureproofing material is in sufficient concentration to produce the highest degree of moistureproofness, a slight haziness results, because it has not been rendered completely compatible with the binding material or other constituents of the moistureproofing coating composition. Furthermore, thin sheet materials so coated have highly specialized applications in uses upon wrapping machinery, and it is highly desirable, if not absolutely necessary, that the surface conditions of the film be accurately adjusted as to hardness, tackiness at room temperature and at elevated temperatures, and adhesion of the coating to the base film. It is very necessary, for instance, that the surface of the film be neither marred nor impaired as to moistureproofness by the operation of the wrapping machine, nor that the sheet material have a tendency to stick to itself or other surfaces at ordinary or slightly elevated temperatures encountered in the operation of wrapping machinery. It is, however, desirable that a strong adhesive bond be produced by application of higher temperatures and pressure.

In the past it has been the practice to incorporate a resinous material in the moistureproofing coating to blend the other ingredients, that is, to transparentize the coating. Materials commonly used for this purpose, as will be clear from the prior art, are natural or synthetic resins, such as dammar, copal, kauri, ester gum, alkyd resins (polybasic acid-polyhydric alcohol resinous condensation products with or without the addition of modifying agents such as monohydric alcohols, mono-basic acids, drying oils, non-drying oils, etc.). Only limited success has been obtained with these materials as transparentizing agents.

This invention had for an object the production of novel compositions of matter adapted to form transparent, non-greasy, non-tacky, moistureproofing coatings for non-moistureproof sheet material. Another object was to provide a moistureproofing coating composition comprising binding material, moistureproofing material such as a wax, and transparentizing material in which larger quantities of wax or compatible than has heretofore been the case. A further object was to produce a novel wax-containing composition for the production of sheets and films or coatings which, in addition to being transparent, non-tacky, moistureproof and non-greasy, will also be heat-sealable to such a degree as to enable continuous surfaces coated therewith to be automatically heat-sealed at moderately elevated temperatures. A general advance in the art, and other objects which will appear hereinafter, were also contemplated.

It has now been found that halogenated aliphatic hydrocarbons containing at least one halogen atom for each 15 carbon atoms and sufficiently high in molecular weight to be of low volatility at ordinary normal room temperatures, make it possible to transparentize moistureproofing coatings containing large quantities of moistureproofing material. It has also been found that such materials, when used as transparentizing agents, improve the chemical and physical characteristics of moistureproof sheet material, and very satisfactorily blend the usual ingredients as well as special modifying ingredients, such as coloring agents (dyes or pigments), oils (drying or non-drying), resins (natural or synthetic), etc.

From the following description and specific examples, in which are disclosed certain embodiments of the invention, as well as details of what is believed to be the best mode for carrying out the invention, it will be apparent how the foregoing objects and related ends are accomplished. Parts, ratios, and the like, are given by weight throughout the application, unless otherwise specified.

Example I

A moistureproof coating composition utilizing 9:10:25:26-tetra-chloro-tetra-triacontane $$(C_{34}H_{62}Cl_4)$$

as the blending agent, was prepared and used to moistureproof regenerated cellulose film containing 16% glycerol as the softener. The solution applied to the surface of the film consisted of:

| | Parts |
|---|---|
| Nitrocellulose (12.5% N) | 60 |
| Paraffin wax (M. P. 60° C.) | 2.5 |
| $C_{34}H_{62}Cl_4$ | 2.5 |
| Dibutyl phthalate | 35 |
| Toluene | 242 |
| Ethyl acetate | 490 |
| Ethyl alcohol | 23 |

The coating operation was carried out by passing the film through a bath of the above solution, removing the excess solution by means of doctor knives, and evaporating the solvent from the resultant at a temperature of approximately 90° C. As soon as the solvent was completely removed, the coated film was passed through a conditioning chamber to impart a certain amount of moisture thereto for the purpose of restoring its original flexibility.

The film was found to be highly transparent, flexible, and to resist the transmission of moisture therethrough to a high degree. It was very satisfactory as a sheet wrapping material, and was found to operate to good advantage upon automatic machines requiring free movement and non-sticking characteristics in the wrapping tissue utilized.

Example II

Regenerated cellulose film was moistureproofed in the manner described in Example I, with a composition consisting of:

| | Parts |
|---|---|
| Nitrocellulose (11% N) | 46.0 |
| Paraffin wax (M. P. 60° C.) | 3.0 |
| Chlorinated paraffin wax (30% Cl) | 1.0 |
| Dibutyl phthalate | 12.5 |
| Dicyclohexyl phthalate | 37.5 |
| Toluene | 238.0 |
| Ethyl acetate | 475.0 |
| Ethyl alcohol | 17.0 |

After removal of the solvent from the composition on the surface of the film, and conditioning, the moistureproof product was found to be highly transparent and flexible. It was non-tacky at room temperature, but sealable by the application of heat and pressure to give a bond strength of 200 (as hereinafter defined). The product had a permeability value of 5 (as hereinafter defined).

In addition to being extremely moistureproof, the product had an advantage in the amount of the transparentizing material employed. Only a very small amount of the above mentioned blending agent is required to produce a highly transparent film. With many of the blending agents heretofore used, a much higher concentration is necessary in order to promote a compatability between the wax and binding agent sufficient to give a transparent film.

Example III

Regenerated cellulose film was moistureproofed in the manner described in Example I, with a composition consisting of:

| | Parts |
|---|---|
| Ethyl cellulose (48% ethoxyl) | 48 |
| Paraffin wax (M. P. 60° C.) | 7 |
| Chlorinated paraffin wax (48% Cl) | 30 |
| Maleic anhydride modified ester gum | 15 |
| Toluene | 584 |
| Ethyl alcohol | 146 |

The film was highly transparent, moistureproof and flexible.

Example IV

Regenerated cellulose film was moistureproofed in the manner described in Example I, with a composition consisting of:

| | Parts |
|---|---|
| Pliolite resin * | 85 |
| Paraffin wax (M. P. 60° C.) | 10 |
| Chlorinated paraffin wax (40% Cl) | 5 |
| Toluene | 730 |

*"Pliolite" is a thermoplastic rubber derivative made by condensing rubber with a catalyst such as tin tetrachloride (see Paper Trade Journal, page 96, February 23, 1939, J. I. E. C. XXVI, 125 and U. S. A. Patents No. 1,797,188, 1,846,247, 1,853,334 and 2,052,391). The chemical structure is also described in "Rubber Age," April, 1939, and J. I. E. C. XIX, 1033.

The sheet material so produced was highly transparent and moistureproof. The moistureproofing coating was found to adhere very well when subjected to high humidities and even water for long periods of time.

Example V

Regenerated cellulose film was moistureproofed in the manner described in Example I, with a composition consisting of:

| | Parts |
|---|---|
| Chlorinated rubber (65%–68% Cl) | 59.0 |
| Paraffin wax (M. P. 60° C.) | 6.0 |
| Chlorinated paraffin wax (61% Cl) | 10.0 |
| Dibutyl phthalate | 12.5 |
| Dicyclohexyl phthalate | 12.5 |
| Toluene | 570.0 |

The resulting moistureproof web was highly moistureproof and transparent, and satisfactory as a wrapping tissue.

Example VI

Regenerated cellulose film was moistureproofed in the manner described in Example I, with a composition consisting of:

| | Parts |
|---|---|
| Chlorinated rubber (65%–68% Cl) | 56.5 |
| Paraffin wax (M. P. 60° C.) | 8.0 |
| Chlorinated paraffin (48% Cl) | 35.0 |
| Calcium rosinate (stabilizer for chlorinated rubber) | 0.5 |
| Toluene | 565.0 |

The resulting moistureproof sheet material was satisfactory as a wrapping tissue.

Example VII

Regenerated cellulose film was moistureproofed in the manner described in Example I, with a composition consisting of:

| | Parts |
|---|---|
| Chlorinated rubber (65%–68% Cl) | 64.5 |
| Paraffin wax (M. P. 60° C.) | 8.0 |
| Chlorinated paraffin (40% Cl) | 27.0 |
| Lithium rosinate | 0.5 |
| Toluene | 565.0 |

The resulting moistureproof sheet material was satisfactory as a wrapping tissue.

*Example VIII*

Regenerated cellulose film was moistureproofed in the manner described in Example I, with a composition consisting of:

| | Parts |
|---|---|
| Ethyl cellulose (organic solvent soluble) | 67 |
| Paraffin wax (M. P. 60° C.) | 3 |
| $CH_3(CH_2)_7CHBrCHBr(CH_2)_6CH_3$ | |
| $CH_3(CH_2)_7CHBrCHBr(CH_2)_6CH_3$ | 20 |
| Butyl toluene sulfonamide | 10 |
| Toluene | 584 |
| Ethyl alcohol | 146 |

The resulting sheet material was highly transparent, moistureproof, and flexible.

The transparentizing or blending agents of this invention are halogenated aliphatic hydrocarbons sufficiently high in molecular weight to be of low volatility at ordinary normal room temperatures. The halogen content of these hydrocarbons must be at least equal to one hydrogen atom for every 15 carbon atoms. Specific members of this group especially suitable are the 9:10:25:26-tetra-halo-tetra-triacontanes such as

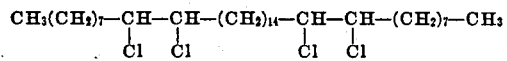

and the corresponding brominated hydrocarbon. In addition to these tetrahalides of $C_{34}H_{66}$ diolefine, chlorinated paraffin waxes in which the original paraffin wax had a melting point in the range 40°–80° C., and halogenated petroleum oils, may be used. The halogenated aliphatic hydrocarbons which have been found to be of particular importance are generally liquid at room temperature or below 35° C. Chlorinated hydrocarbons are preferred. The chlorinated products mentioned contain between 10% and 65% chlorine.

As the moistureproofing agents, any wax (used generically to include waxy substances like paraffin wax, as well as true waxes which are monohydric alcohol esters of higher fatty acids) may be employed. Ordinarily paraffin wax melting above 50° C., or better, that melting at 60° C. (and above) is preferred. Other waxes, such as Japan wax, palm wax, spermaceti, beeswax and Chinese insect wax, warrant special mention. Products of rather high melting point are preferred. It is possible to manufacture synthetic waxes and wax-like materials which are fairly satisfactory substitutes for the natural ones, and these products may also be used. Other materials, such as those described in the U. S. A. Patents No. 2,098,534–42, may be used satisfactorily.

Paraffin waxes of higher or lower melting points than that previously mentioned may be used, depending upon the degree of moistureproofness and/or surface characteristics desired. If some of the aforementioned substances are too soft for the purposes desired, they may be mixed with harder waxes of the group just listed, or with carnauba wax, candelilla wax, or other harder synthetic waxes. It is preferable to employ a waxy material such as paraffin wax as the moistureproofing material and to harden this by the addition of carnauba or candelilla wax if necessary, but for some purposes it may be desirable to use only the harder waxes such as carnauba wax or candelilla wax.

As binding or film-forming ingredients, the cellulose substitution derivatives, for example, cellulose ethers such as glycol, ethyl and benzyl cellulose, cellulose esters such as cellulose nitrate (which is particularly useful), cellulose acetate (which is of limited compatibility), and mixed esters or ethers or ether-esters, such as cellulose acetate nitrate, cellulose acetate propionate, and ethyl cellulose acetate, may be used satisfactorily. The cellulose derivatives may be of various degrees of conversion, as for example, cellulose nitrates of various nitrogen contents (11.0% to 12.5% being preferred).

Rubber and materials derived therefrom are also suitable for binding materials. The most desirable among these are pure gum or unvulcanized rubber, caoutchouc, gutta percha, chlorinated rubber (65%–68% Cl) synthetic rubbers, such as the polymers of isobutadiene and their homologues, may be utilized. The aforementioned rubber and allied materials may be used singly or in combination with one another or with the cellulose derivatives mentioned above.

Certain resins, especially certain synthetic resins, are also suitable as the binding material. As a specific example of such a material, mention may be made of acrylic acid derivatives such as those disclosed in U. S. A. Patent No. 2,137,636 (Barrett).

Preferred plasticizing materials include tricresyl phosphate, dibutyl phthalate, dicyclohexyl phthalate, di-methylcyclohexyl phthalate, di-(dimethyl cyclo hexyl) phthalate, dicyclohexyl adipate, methyl-(dimethyl cyclohexyl) adipate, and butyl benzoyl benzoate. Since the halogenated hydrocarbons employed as transparentizing agents in this invention contribute considerable flexibility to the film, it is possible to eliminate the plasticizer entirely in some instances, and to use only very small amounts of placticizer in other instances, and still obtain very desirable results.

In many instances it may be desirable to add resinous materials to the moistureproof coating compositions comprising the halogenated paraffin, and for this purpose any of the natural or synthetic resins commonly available may be used so long as they are compatible and form homogenous mixtures. Specific examples of such resins are rosinates, dammar, copal, kauri, polyhydric alcohol-polybasic acid resinous condensation products (alkyd resins), vinyl derivatives, chlorinated diphenyl resins, soluble phenol-formaldehyde resins, and the like.

As the base sheet, this invention contemplates any smooth, substantially non-porous, non-fibrous sheet, especially cellulosic film precipitated from an aqueous cellulosic or aqueous alkaline cellulosic dispersion or solution. This includes webs of regenerated cellulose, whether precipitated from viscose (solutions of cellulose xanthate), cuprammonium, or any other aqueous solutions or dispersions of cellulose. It also includes sheets of cellulose ethers precipitated from aqueous solutions or dispersions (U. S. A. Patent No. 2,123,883 to Ellsworth), such as glycol cellulose, cellulose glycolic acid, alkyl cellulose (preferably methyl or ethyl cellulose), and the like. These specific cellulose substitution derivatives just mentioned are usually grouped under the generic term low (or lowly) substituted cellulose ethers. In the language of the art, low substituted cellulose derivatives are those in which there is not more than one mol of substitution per glucose unit.

Base materials made by other manufacturing technique, for example, the cellulose ether and cellulose ester films cast from organic solvent solutions such as ethyl cellulose, benzyl cellulose, glycol cellulose, cellulose nitrate, cellulose acetate, and the like, may also be used. Desirable results are also obtained when the moistureproofing coatings are applied to sheets of gelatin, casein, transparent sheets of materials such as rubber hydrochloride which are moistureproof per se, parchment chemically or mechanically treated, hydrated paper, tissue paper, and the like. Surfaces of wood, metal, etc., may also be coated with these compositions.

The wide variety of materials for use in moistureproof coating compositions, and the characteristics which render them suitable for such a composition, are well known in the art and are described in patents cited elsewhere in this application. In order to avoid encumbering this specification, reference is made to those patents for further information.

For the usual coating methods, the moistureproofing coating lacquers (compositions) must be available in solution. The usual solvents or solvent mixtures well known in this art serve satisfactorily with the present invention. Generally speaking, the solvent will contain a cellulose derivative solvent (or solvent for other binding agent present) and a wax solvent, as well as a solvent for the halogenated hydrocarbon material, and optionally, a diluent. The same solvent can serve both for the halogenated hydrocarbon material and the other constituents, and it may be that the cellulose derivative solvent or solvent for other binder will also be a wax solvent. A solvent mixture comprising 40%–90% ethyl acetate and up to 50% toluene, and the balance ethyl alcohol, will usually be found to operate satisfactorily in the case of coating compositions having cellulose derivatives as the binding agent. Depending upon the amount and nature of the cellulose derivative (or other binder) present or the wax, the amount and nature of the respective solvents will vary. Satisfactory solvents for specific compositions are illustrated in the examples in the prior art in this field.

In the preparation of a transparent moistureproof sheet wrapping material, a suitable wax containing composition comprising a cellulose derivative (or other binder) and a halogenated hydrocarbon (such as the tetrachloride or tetrabromide of the $C_{34}H_{66}$ diolefine), is preferably applied to a transparent base in accordance with the methods known to the art. The solvents may be removed and the coated material subjected to an elevated temperature at least equal to the melting point of the wax, whence a clear, transparent, moistureproof sheet material may be obtained. The technique of this procedure is set forth in the patents noted above.

The amount of the solvent mixture may vary according to the composition, and to the method of application. The viscosity of the coating composition may be controlled by the amount and nature of the solvent, and may be adjusted easily to adapt a solution for coating by brushing, spraying, dipping, or any method familiar to the art.

In preparing moistureproofing coating compositions comprising halogenated hydrocarbons, it has been found that the best results are obtained by limiting the relative amounts of the several constituents. The amount of binder, for example, may vary from 30%–70% or more of the total solids, although in most instances 40%–60% is preferred. If a halogenated hydrocarbon material is simply a blending agent, its amount may be of the order of 1%–5%, but if it serves also as the binding ingredient, it may constitute 8%–30% or more, while if it serves also as a plasticizer, it may be present in amounts as high as 30%–50% of the total solids content. Usually, it is desirable to maintain a ratio of halogenated hydrocarbon material to binder in the neighborhood of 1 to 10, although ratios as low as 1 to 1½, or as high as 1 to 50, may sometimes be advantageous.

The wax content of these moistureproofing compositions may vary from 0.5% to 1% to 10% or more of the total solids content. Usually about 4% is satisfactory, although more or less may be found desirable for this purpose. The ratio of wax to halogenated hydrocarbon transparentizing agent may vary from 5:1 to 1:14, although about 1:2 is generally a good combination.

The amount of the plasticizer may vary, of course, from none at all to about 40%–50% of the solids content of the composition. The ratio of plasticizer to binding ingredient depends on the nature of the binding ingredient, the nature and amount of wax and the plasticizer itself. It has been found that 1:1 to 1:1.5 may produce very good results, although the optimum ratio would seem to be about 1:1.25.

While in general films with satisfactory surface conditions are produced by applying a moistureproofing coating containing a halogenated hydrocarbon as a blending agent, there may arise occasions when coating compositions with other desirable characteristics are found to have a surface which is somewhat tacky, giving rise to adhesion between sheets when stacked for long periods of time, or when tightly wound in rolls. Under such circumstances, it is often possible to produce a product having satisfactory slip and non-sticking by applying over the moistureproofing coating composition another composition such as a nitrocellulose lacquer, which will give the desired surface characteristics without impairing the other properties of the coated film.

Although the specification thus far has been concerned primarily with coating compositions, it is within the scope of this invention, however, to produce self-sustaining film having the solids compositions set forth. These films may be prepared in any of the ways known to the art, such as by casting, using suitable solvent content to facilitate the operation.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

The following test has been devised to determine and test the strength of heat seal bonds mentioned in the specification. Strips of the coated material 1½ inches wide are superposed on one end so that the opposite faces of the film are in contact. A seal is made across the width of the material by imposing thereon a heated iron weighing 1500 grams for 2 seconds. The iron is so designed as to cause a seal to be made of a width of 9/32 inch, the iron being maintained in any suitable manner at a temperature above 130° C. and below 200° C., as for instance, 150° C. Two strips so sealed are opened at the free end and placed in a stretching device, such as a Suter testing machine, by gripping each end of the sheet in suitable clamps, one of which is fixed and the other of which is moved away at a constant speed of 12 inches per minute. The force in grams required to pull the sheets apart is taken as a measure of the strength of the bond and is referred to herein as "heat sealing value."

The halogenated hydrocarbon blending agents of the instant invention are extremely effective in small concentrations for promoting the compatibility of wax or wax-like moistureproofing agents for film-forming materials of a wide variety. In this respect, a much lower percentage of the halogenated hydrocarbon is required than that of most other blending agents known heretofore in the production of highly transparent compositions.

In general, the coating compositions containing these blending agents do not exhibit a sticky or tacky surface at ordinary temperatures, and hence may be operated satisfactorily upon automatic wrapping machinery. Nevertheless, when heat-sealable temperatures are attained, the strength of heat-seal bond is at least as great as, or greater than, when halogenated hydrocarbon blending agents are absent. Not only is it desirable that the coating on such film be non-tacky and that it not stick to other sheets and objects with which it may come in contact, but also that it adhere firmly to the film upon which it is deposited. If this coating tends to become loose and peel off, that section of the film which loses its coating will no longer give adequate protection against the escape of vapor, and the materials thus lost from the surface of the film may foul apparatus such as automatic wrapping machinery, giving rise to the spoilage of material, loss of time of operation and additional labor. It has been found that coating compositions which contain the halogenated hydrocarbon materials adhere to the film with great tenacity, thus minimizing these evils.

These blending agents, because of the compatibility with a wide variety of materials, function successfully to blend moistureproofing wax and wax-like materials with a wide variety of film-forming ingredients, and hence are applicable to a great variety of coating compositions.

As many apparently widely different embodiments of this invention may be made without departing from the spirit and scope thereof, it is to be understood that this invention is not limited to the specific embodiments thereof except as defined in the appended claims.

I claim:

1. A moistureproof sheet wrapping material comprising a non-moistureproof base sheet coated with a moistureproofing composition, said moistureproofing composition comprising essentially wax, binding material, and transparentizing halogenated paraffin wax containing at least one halogen atom for each 15 carbon atoms.

2. The product of claim 1 when the halogenated paraffin wax is chlorinated paraffin wax.

3. The product of claim 1 when the base sheet is regenerated cellulose and the halogenated paraffin wax is chlorinated paraffin wax.

4. A moistureproof sheet wrapping material comprising a non-moistureproof base sheet coated with a moistureproofing composition, said moistureproofing composition comprising essentially wax, binding material, plasticizing material, and transparentizing halogenated paraffin wax containing at least one halogen atom for each 15 carbon atoms.

5. A thin, flexible sheet material comprising a film of a moistureproofing composition, said moistureproofing composition comprising 1% to 10% wax, 30% to 70% binding material, 0% to 40% plasticizer, and 1% to 5% transparentizing halogenated paraffin wax containing at least one halogen atom for each 15 carbon atoms, the ratio of halogenated paraffin wax to binder being within the range 1:1.5 to 1:50, the said sheet material being moistureproof.

6. A thin, flexible sheet material comprising a film of a moistureproofing composition, said moistureproofing composition comprising 1% to 10% wax, 30% to 70% chlorinated rubber, 0% to 40% plasticizer, and 1% to 5% transparentizing halogenated paraffin wax containing at least one halogen atom for each 15 carbon atoms, the ratio of halogenated paraffin wax to chlorinated rubber being within the range 1:1.5 to 1:50, the said sheet material being moistureproof.

7. A thin, flexible sheet material comprising a film of a moistureproofing composition, said moistureproofing composition comprising 1% to 10% wax, 30% to 70% binding material, 0% to 40% plasticizer, and 1% to 5% transparentizing chlorinated paraffin wax containing at least one chlorine atom for each 15 carbon atoms, the ratio of chlorinated paraffin wax to binder being within the range 1:1.5 to 1:50, the said sheet material being moistureproof.

8. A thin, flexible sheet material comprising a film of a moistureproofing composition, said moistureproofing composition comprising 1% to 10% wax, 40% to 60% chlorinated rubber, 0% to 40% plasticizer, and 1% to 5% transparentizing chlorinated paraffin wax containing at least one chlorine atom for each 15 carbon atoms, the ratio of chlorinated paraffin wax to chlorinated rubber being within the range 1:1.15 to 1:50, the said sheet material being moistureproof.

9. A thin, flexible sheet material comprising a film of a moistureproofing composition, said moistureproofing composition comprising 1% to 10% wax, 30% to 70% chlorinated rubber, 0% to 40% plasticizer, and 1% to 5% chlorinated paraffin (40% Cl), the ratio of chlorinated paraffin to chlorinated rubber being within the range 1:1.5 to 1:50, the said sheet material being moistureproof.

10. A thin, flexible sheet material comprising a film of a moistureproofing composition, said moistureproofing composition compring 1% to 10% paraffin wax, 30% to 70% chlorinated rubber, 0% to 40% plasticizer, and 1% to 5% chlorinated paraffin (40% Cl), the ratio of chlorinated paraffin to chlorinated rubber being within the range 1:1.5 to 1:50, the said sheet material being moistureproof.

11. A thin, flexible sheet material comprising a film of a moistureproofing composition, said moistureproofing composition comprising 1% to 10% wax, 40% to 60% binding material, 0% to 40% plasticizer, and 1% to 5% transparentizing halogenated paraffin wax containing at least one halogen atom for each 15 carbon atoms, the ratio of halogenated paraffin wax to binder being within the range 1:1.5 to 1:50, the said sheet material being moistureproof.

12. A thin, flexible sheet material comprising a film of a moisture-resistant composition, said moisture-resistant composition comprising 1% to 10% wax, 30% to 70% chlorinated rubber, 0% to 40% plasticizer, and 1% to 5% chlorinated paraffin liquid below 35° C., the ratio of chlorinated paraffin to chlorinated rubber being within the range 1:1.5 to 1:50, the said sheet material being moisture-resistant.

13. A thin, flexible sheet material comprising a film of a moisture-resistant composition consisting of:

| | Parts |
|---|---|
| Chlorinated rubber (65%-68% Cl) | 64.5 |
| Paraffin wax (M. P. 60° C.) | 8.0 |
| Chlorinated paraffin (40% Cl) | 27.0 |
| Lithium rosinate | 0.5 |

14. A moistureproof sheet wrapping material comprising a regenerated cellulosic base sheet coated with a moistureproofing composition, said moistureproofing composition comprising essentially wax, binding material, plasticizing material, and transparentizing chlorinated paraffin wax containing at least one chlorine atom for each 15 carbon atoms.

15. A moistureproof sheet wrapping material comprising a non-moistureproof base sheet coated with a moistureproofing composition, said moistureproofing composition comprising essentially wax, binding material, plasticizing material, and transparentizing chlorinated paraffin wax containing at least one chlorine atom for each 15 carbon atoms.

16. A moistureproof sheet wrapping material comprising a regenerated cellulose base sheet coated with a moistureproofing composition, said moistureproofing composition comprising essentially wax, binding material, plasticizing material, and transparentizing halogenated paraffin wax containing at least one halogen atom for each 15 carbon atoms.

17. A moistureproof sheet wrapping material comprising a regenerated cellulosic base sheet coated with a moistureproofing composition, said moistureproofing composition comprising essentially wax, binding material, and transparentizing halogenated paraffin wax containing at least 1 halogen atom for each 15 carbon atoms.

18. A thin, flexible sheet material comprising a film of moisture resistant composition consisting of:

| | Parts |
|---|---|
| Chlorinated rubber (65%-68% Cl) | 56.5 |
| Paraffin wax (M. P. 60° C.) | 8.0 |
| Chlorinated paraffin (48% Cl) | 35.0 |
| Calcium rosinate | 0.5 |

19. A thin, flexible sheet material comprising a film of moisture resistant composition consisting of:

| | Parts |
|---|---|
| Chlorinated rubber (65%-68% Cl) | 59.0 |
| Paraffin wax (M. P. 60° C.) | 6.0 |
| Chlorinated paraffin wax (61% Cl) | 10.0 |
| Dibutyl phthalate | 12.5 |
| Dicyclohexyl phthalate | 12.5 |

JAMES A. MITCHELL.

CERTIFICATE OF CORRECTION.

Patent No. 2,307,057. January 5, 1943.

JAMES A. MITCHELL.

It is hereby certified that error appears in the printed specification of the above numbered patent requiring correction as follows: Page 1, second column, line 23, for "or" read --are--; page 2, first column, line 12, for "collulose" read --cellulose--; page 3, first column, line 5, for "film" read --web--; and second column, line 20, after the parenthesis insert a period; same line, for "synthetic" read --Synthetic--; line 42, for "placticizer" read --plasticizer--; page 4, second column, line 18, for "to" first occurrence, read --or--; page 5, second column, line 44, claim 8, for "range 1:1.15 to 1:50" read --range 1:1.5 to 1:50--; line 57, for "compring" read --comprising--; line 59-60, for "chloronated" read --chlorinated--; and that the said Letters Patent should be read with this correction therein that the same may conform to the record of the case in the Patent Office.

Signed and sealed this 30th day of March, A. D. 1943.

(Seal)

Henry Van Arsdale,
Acting Commissioner of Patents.